(12) United States Patent
Lin et al.

(10) Patent No.: US 9,138,927 B2
(45) Date of Patent: Sep. 22, 2015

(54) INJECTION MOLDING MODULE HAVING A RUNNER CHANGING A FLOW DIRECTION OF PLASTIC MATERIAL FED INTO AN INLET THEREOF

(71) Applicant: Wistron Corporation, New Taipei (TW)

(72) Inventors: Yuan-Shiang Lin, New Taipei (TW); Chien-Hung Tsai, New Taipei (TW); An-Chen Hung, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/205,192

(22) Filed: Mar. 11, 2014

(65) Prior Publication Data

US 2015/0004278 A1 Jan. 1, 2015

(30) Foreign Application Priority Data

Jun. 28, 2013 (TW) .............................. 102123283 A

(51) Int. Cl.
*B29C 45/23* (2006.01)
*B29C 45/27* (2006.01)
*B29C 45/33* (2006.01)
B29C 45/58 (2006.01)
B29C 44/58 (2006.01)

(52) U.S. Cl.
CPC ............. *B29C 45/2756* (2013.01); *B29C 45/33* (2013.01); *B29C 44/582* (2013.01); *B29C 44/585* (2013.01); *B29C 45/585* (2013.01)

(58) Field of Classification Search
CPC ............................. B29C 44/582; B29C 44/585

USPC ............................. 425/DIG. 58, 572; 264/318
See application file for complete search history.

(56) References Cited

U.S. PATENT DOCUMENTS

| | | | | |
|---|---|---|---|---|
| 4,889,480 A | * | 12/1989 | Nakamura et al. | ............. 425/577 |
| 8,529,244 B2 | * | 9/2013 | Gong et al. | ................... 425/556 |
| 2005/0208172 A1 | * | 9/2005 | Buttigieg | ...................... 425/441 |

FOREIGN PATENT DOCUMENTS

| | | |
|---|---|---|
| JP | H03-5291 B2 | 1/1991 |
| JP | 2859505 B2 | 2/1999 |
| JP | 3399831 B2 | 4/2003 |
| JP | 2006-231781 A | 9/2006 |

OTHER PUBLICATIONS

The Office Action issued to Taiwanese Counterpart Application No. 102123283 by the Taiwan Intellectual Property Office on Feb. 24, 2015 along with an English translation of sections boxed in red.

* cited by examiner

*Primary Examiner* — Tim Heitbrink
(74) *Attorney, Agent, or Firm* — Blakely Sokoloff Taylor & Zafman LLP

(57) ABSTRACT

The disclosure relates to an injection molding module including a mold unit and a slider that is disposed in the mold unit and that cooperates with the mold unit to define a cavity and a cooling runner in spacial communication with the cavity. The cooling runner includes a main section that is formed with an inlet, and a tapering section that extends from the main section in a lengthwise direction and that is formed with an outlet in spatial communication with the cavity. The inlet has an axial direction that is not parallel with the lengthwise direction, thereby the plastic material having a flow direction that is changed when a plastic material is fed into the cooling runner through the inlet.

9 Claims, 3 Drawing Sheets

INJECTION MOLDING MODULE HAVING A RUNNER CHANGING A FLOW DIRECTION OF PLASTIC MATERIAL FED INTO AN INLET THEREOF

CROSS REFERENCE TO RELATED APPLICATION

This application claims priority of Taiwanese application no. 102123283 filed on Jun. 28, 2013, the disclosure of which is incorporated herein by reference.

BACKGROUND OF THE DISCLOSURE

1. Field of the Disclosure

The disclosure relates to an injection molding module, more particularly to an injection molding module that is able to prevent a fiber component that is present in a plastic material to be injection molded from damaging a surface of a molded product. The disclosure also relates to an injection molding method utilizing the injection molding module.

2. Description of the Related Art

In recent years, for the process of injection molding plastic materials, in order to enhance the rigidity, surface smoothness, brightness and other characteristics of the molded products to meet the consumers' demands, a great number of fiber components (such as glass fiber, carbon fiber, etc.) are added to the plastic material.

Referring to FIG. 1, a conventional injection molding module 1 is shown to include a male mold 11 and a female mold 12 that are fitted in with each other and that cooperate with each other to define a cavity 13. The male mold 11 is formed with a cooling runner 14 that is in spatial communication with the cavity 13 and the outside of the conventional injection molding module 1. During the injection molding operation, plastic material is injected into and fills the cavity 13 by an injection nozzle 15 through the cooling runner 14 from the outside of the conventional injection molding module 1, and is then finally cooled to form the finished molded product.

However, addition of the fiber components into the plastic material during the injection molding operation as mentioned above tends to create a new problem that is not encountered when the plastic material is free of fiber components. Specifically, when the plastic material that contains the fiber components enters the cavity 13 from the cooling runner 14, the fiber components tend to continuously impact the inner surface of the female mold 12 that faces the cooling runner 14 (as indicated by the letter A in FIG. 1). Consequently, the inner surface of the female mold 12 is unavoidably scratched by the plastic material, which leads to damaged appearance of the molded product, e.g., having mist-like defects. Such molded products cannot meet the consumers' requirements for brightness and smoothness. In addition, once the inner surface of the female mold 12 is damaged, the entire injection molding process will be forced to shut down for repairing the conventional injection molding module 1. Hence, not only are extra time and manpower needed, but the shutdown of the production lines also results in a reduction in productivity. Furthermore, in this conventional injection molding module 1, the cooling runner 14 extends in a single direction to the cavity 13 from the outside. After the molded product is cooled down and shaped, a residue of the plastic material left in the cooling runner 14 is connected to the molded product and needs to be removed, increasing both the production cost and time. Evidently, there is plenty of room for improvement in the conventional injection molding module 1.

SUMMARY OF THE DISCLOSURE

Therefore, an object of the disclosure is to provide an injection molding module that is capable of preventing a molded product from having a damaged surface.

Another object of the disclosure is to provide an injection molding module with an easier removal process of removing a residual plastic material from the molded product.

Yet another object of the disclosure is to provide an injection molding module that is capable of preventing an inner surface of a mold unit of the injection molding module from being scratched.

Still another object of the disclosure is to provide an injection molding method utilizing the abovementioned injection molding module.

According to the disclosure, an injection molding module for making a molded product includes a mold unit and a slider that is disposed in the mold unit and that cooperates with the mold unit to define a cavity and a cooling runner in spacial communication with the cavity.

The cavity includes a first portion for molding a main wall of the molded product and a second portion that is connected to the first portion for molding a side wall of the molded product.

The cooling runner includes a main section that has a first end formed with an inlet for feeding a plastic material and a second end opposite to the first end, and that extends in a lengthwise direction, and a tapering section that extends from the second end of the main section along the lengthwise direction, that is formed with an outlet in spatial communication with the second portion of the cavity, and that has a cross-section tapering off toward the outlet. The inlet has an axial direction that is not parallel with the lengthwise direction, thereby the plastic material having a flow direction that is changed when the plastic material is fed into the cooling runner through the inlet.

The effects achievable by the disclosure reside in the following. By virtue of the inlet having an axial direction that is not parallel with the lengthwise direction of the main section of the cooling runner, the plastic material has a flow direction that is changed when the plastic material is fed into the cooling runner through the inlet so as to destroy the directionality of the plastic material flow. By virtue of the design of the tapering section, the plastic material forms two portions having different flow directions before entering the cavity and the two portions are mixed with each other and have an increased temperature, thereby again destroying the directionality of the flow of the plastic material and avoiding the damage to the inner surface of the mold unit of the injection molding module otherwise caused by the plastic material if the same flows from the inlet into the outlet along a single direction. Besides, since the outlet of the cooling runner is in spacial communication with the second portion for molding the side wall of the molded product, the residual plastic material is connected to the second portion of the cavity that has a relatively low brightness requirement. Additionally, the area of the molded product connected to the residual plastic material is also reduced by means of the tapering section and thus, the residual plastic material connected to the molded product can be easily broken off and additional cost and time required for the process of removing the residual plastic material, such as computer numeric control (CNC) processing, numeric control (NC) processing or manual cutting processing, can be omitted.

BRIEF DESCRIPTION OF THE DRAWINGS

Other features and advantages of the disclosure will become apparent in the following detailed description of the embodiments with reference to the accompanying drawings, of which.

DETAILED DESCRIPTION OF THE EMBODIMENTS

Figure 1:
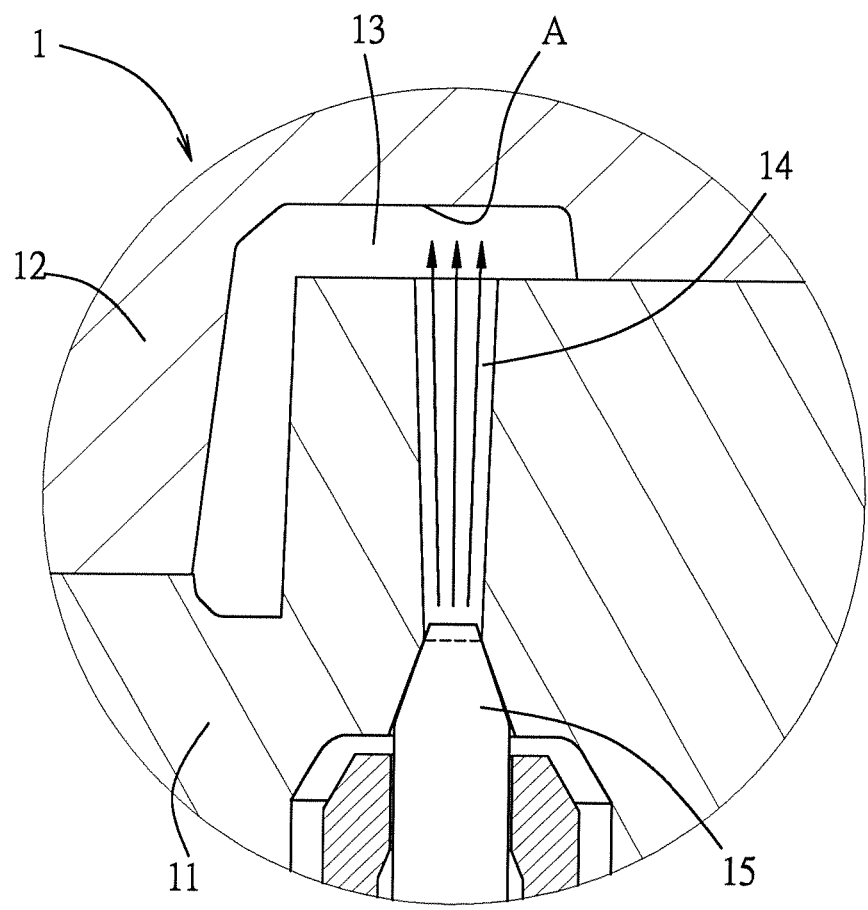
FIG. 1 is a sectional view of a conventional injection molding module.

Before the present disclosure is described in greater detail with reference to the accompanying embodiments, it should be noted herein that like elements are denoted by the same reference numerals throughout the disclosure.

Figure 2:
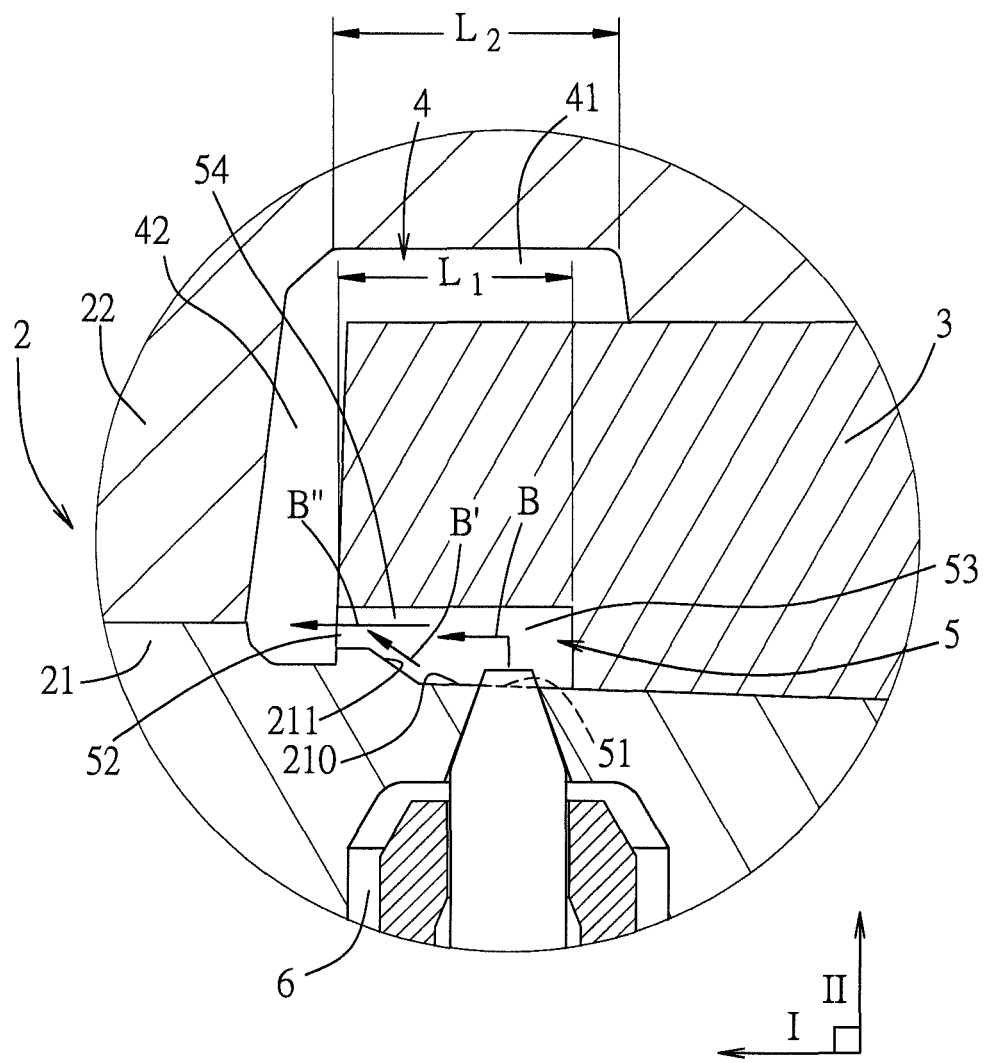
FIG. 2 is a sectional view of the first embodiment of an injection molding module according to the present disclosure.

Referring to FIG. 2, the first embodiment of an injection molding module according to the present disclosure is illustrated. The injection molding module includes a mold unit 2, a slider 3 disposed in the mold unit 2, a cavity 4 and a cooling runner 5. The mold unit 2 includes a first mold 21 and a second mold 22. The first mold 21 and the second mold 22 cooperate with the slider 3 to define the cavity 4. The first mold 21 has an inner wall surface 210. The slider 3 cooperates with the inner wall surface 210 to define the cooling runner 5. The inner wall surface 210 includes an inclined region 211. The cavity 4 is used for forming a molded product and includes a first portion 41 for molding a main wall of the molded product and a second portion 42 that is connected to the first portion 41 for molding a side wall of the molded product. The slider 3 is displaceable relative to the first mold 21 so as to be disengaged from the molded product after molding of the molded product in the cavity 4 is accomplished.

The cooling runner 5 includes a main section 53 that has a first end formed with an inlet 51 for feeding a fiber-component-containing plastic material and a second end opposite to the first end and that extends along a lengthwise direction (I), and a tapering section 54 that extends from the second end of the main section 53 along the lengthwise direction (I) and that is formed with an outlet 52 in spatial communication with the second portion 42 of the cavity 4. The tapering section 54 has a cross-section that is in the shape of trapezoid and that tapers off toward the outlet 52. The inlet 51 has an axial direction (II) that is not in parallel with the lengthwise direction (I). In this embodiment, an included angle between the lengthwise direction (I) of the main section 53 and the axial direction (II) of the inlet 51 is 90 degrees.

An injection molding method for making a molded product from a fiber-component-containing plastic material using the injection mold module of the present disclosure includes the following steps:

(a) The plastic material is injected into the inlet 51 of the main section 53 of the cooling runner 5 of the injection molding module. The axial direction (II) of the inlet 51 is non-parallel with the lengthwise direction (I). Therefore, the plastic material has a flow direction (as shown by arrows B, B' and B" in FIG. 2) that changes from a feeding direction of the plastic material through the inlet 51. That is to say, the directionality of the plastic material injected from a nozzle 6 is destroyed due to change in the flow direction.

(b) The plastic material entering the main section 53 of the cooling runner 5 is forced to subsequently flow into the tapering section 54 along the lengthwise direction (I) and to impact the inclined region 211 of the inner surface 210 of the first mold 21, thereby having the flow direction of a portion of the plastic material from the lengthwise direction (I) to being along the inclined region 211 (as shown by the arrow B' in FIG. 2), the portion of the plastic material having an increased temperature and being mixed with the remainder of the plastic material. As such, the directionality of the flow of the plastic material is destroyed again and before entering the second portion 42 of the cavity 4 through the outlet 52, followed by filling the second portion 42 and the first portion 41 of the cavity 4 to form the molded product.

Since the directionality of the flow of the plastic material in the cooling runner 5 is destroyed due to the change in the flow direction of the plastic material in the above step (a) and due to mixing of the portions with different flow directions under the increased temperature, the damage caused on the inner surface of the mold unit 2 if the plastic material flows from the inlet 51 into the outlet 52 along a single direction is avoided, thereby being able to create the molded product with undamaged appearance using the undamaged mold unit 2. Besides, since the inner surface of the mold unit 2 is not liable to damage caused by the plastic material, there is no need for shutting down the entire injection molding process to repair the injection molding module, and thus, the production time and manpower can be greatly saved. With the non-interrupted injection molding process, productivity can be enhanced.

Additionally, since the outlet 52 of the cooling runner 5 is in spacial communication with the second portion 42 for molding the side wall of the molded product, the residual plastic material is connected to the second portion 42 of the cavity 4 that has a relatively low brightness requirement. Furthermore, the cross-section of the outlet 52 is reduced by the design of the tapering section 54, and the area of the molded product connected to the residual plastic material is also reduced. Hence, the residual plastic material connected to the molded product can be easily broken off without a disadvantageous effect on brightness property of the molded product. Great cost and time for conducting computer numeric control (CNC) processing to remove the residual plastic material as required by the conventional injection molding module 1 (see FIG. 1) can be avoided. In this embodiment, for facilitating removal of the residual plastic material, the outlet 52 has a cross-section area of approximately 5 mm$^2$ and the cooling runner 5 has an entire length ($L_1$) of approximately 10 mm. Alternatively, the cross-section area of the outlet 52 and the entire length of the cooling runner 5 may be less than 5 mm$^2$ and 10 mm, respectively, or the entire length ($L_1$) of the cooling runner 5 maybe less than 90% of the width ($L_2$) of the first portion 41 of the cavity 4, as long as the residual plastic material connected to the molded product can be easily broken off.

Figure 3:
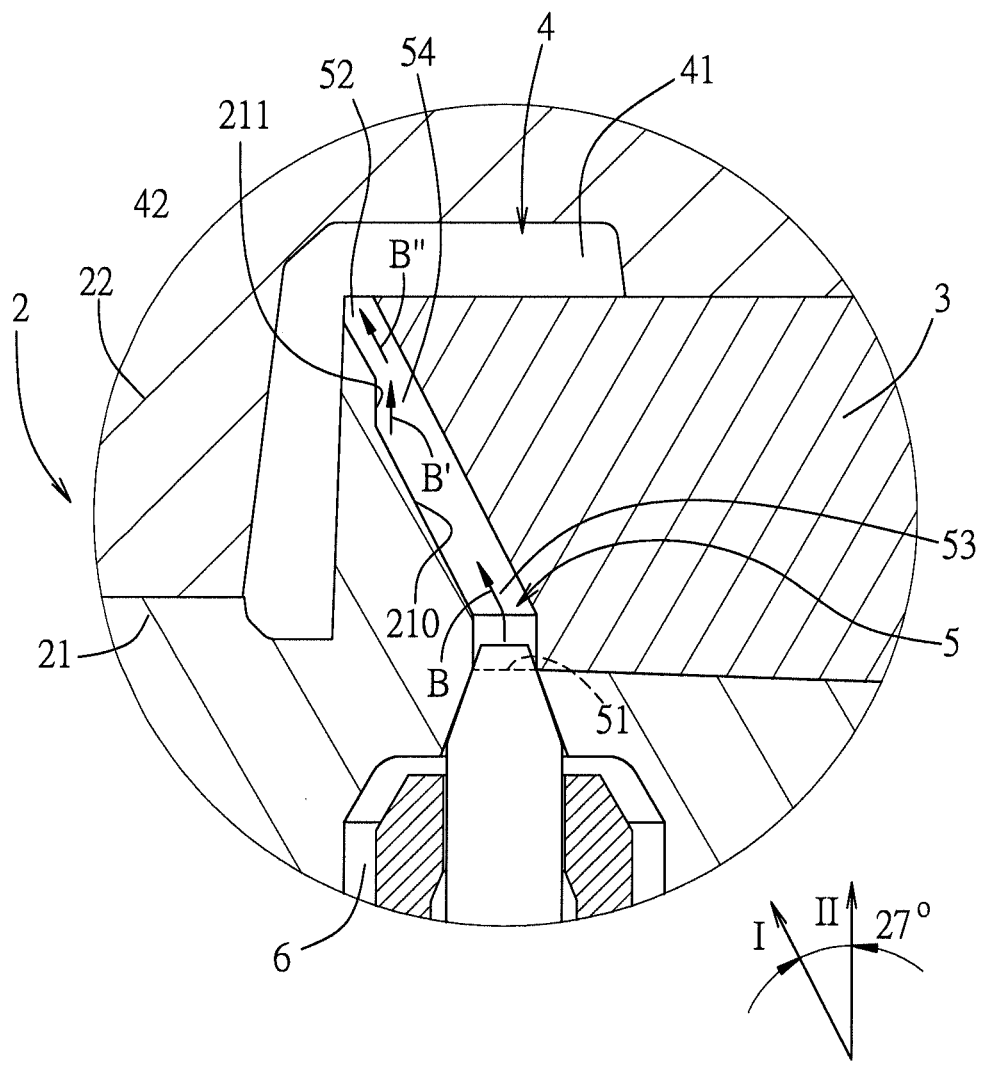
FIG. 3 is a sectional view of the second embodiment of an injection molding module according to the present disclosure.

Referring to FIG. 3, the second embodiment of an injection molding module of this disclosure is generally identical to the first embodiment in structure. However, in the second embodiment, as the result of adaption for molded products of a different size, the location of the outlet 52 and the lengthwise direction (I) of the main section 53 of the cooling runner 5 are changed such that the included angle between the lengthwise direction (I) and the axial direction (II) of the inlet 51 is approximately 27 degrees and such that the outlet 52 is located at the intersection between the first portion 41 and the second portion 42 of the cavity 4. Although the included angle of 27 degrees embodied in the second embodiment is smaller than the included angle of 90 degrees embodied in the first embodiment, the flow direction of the plastic material can still be changed (as shown by arrows B, B' and B" in FIG. 2) when the plastic material is fed into the cooling runner 5 through the inlet 51 so as to destroy the directionality of the plastic material flow. Besides, the arrangement of the cooling runner 5 non-perpendicular to the first mold 21, the second mold 22 and the slider 3 prevents the residual plastic material remained in the cooling runner 5 after the molded product is formed from blocking the mutual disengagements among the first mold 21, the second mold 22 and the slider 3 so as to facilitate easy removal of the molded product. It should be noted herein that, the included angle formed between the lengthwise direction (I) of the main section 53 and the axial direction (II) of the inlet 51 may be adjusted to any degree between 27 degrees and 90 degrees, as long as the flow direction of the plastic material can still be changed (as shown by arrows B, B' and B" in FIG. 3) when the plastic material is fed into the cooling runner 5 through the inlet 51 to destroy the directionality of the plastic material flow and as long as the residual plastic material does not block release of the molded product.

It is worth to mention herein that, in order to ensure fire safety, many molded products are made from a plastic material added with flame retardant components. Use of flame retardant components tends to release a gas (such as methane gas) during the high temperature operation of the injection molding process. If a mass of the gas enters the cavity 4 along with the plastic material and the gas pressure is concentrated at the cavity 4, the gas tends to impact the surface of the molded product and form defects thereon. In this disclosure, the design of changing the flow direction of the plastic material when the plastic material is fed into the cooling runner 5 through the inlet 51 may reduce the pressure of the gas so as to prevent the gas pressure from being concentrated at the cavity 4 and so as to avoid formation of defects on the surface of the molded product.

In view of the foregoing, by virtue of the axial direction (II) of the inlet 51 being not in parallel with the lengthwise direction (I), the flow direction of the plastic material is changed (as shown by arrows B, B' and B" in FIGS. 2 and 3) when the plastic material is fed into the cooling runner 5 through the inlet 51 so as to destroy the directionality of the plastic material flow. Furthermore, by virtue of the design of the tapering section 54, the plastic material forms two portions having different flow directions before entering the cavity 4, and the two portions are mixed with each other and have an increased temperature, thereby again destroying the directionality of the flow of the plastic material and preventing damage to the inner surface of the mold unit 2 of the injection molding module, which is otherwise caused by the plastic material if the same flows from the inlet 51 into the outlet 52 along a single direction. Besides, since the outlet 51 of the cooling runner 5 is in spacial communication with the second portion 42 for molding the side wall of the molded product, the residual plastic material is connected to the second portion 42 of the cavity that has a relatively low brightness requirement. Additionally, the area of the molded product connected to the residual plastic material is also reduced by means of the tapering section 54 and thus, the residual plastic material connected to the molded product can be easily broken off and additional cost and time required for the process of removing the residual plastic material, such as computer numeric control (CNC) processing, can be omitted.

While the disclosure has been described in connection with what are considered the most practical and embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An injection molding module for making a molded product, comprising:
   a mold unit; and
   a displaceable slider that is disposed in said mold unit, said displaceable slider cooperating with said mold unit to define a cavity and a runner in spacial communication with said cavity,
   said cavity including a first portion for molding a main wall of the molded product and a second portion that is connected to said first portion for molding a side wall of the molded product,
   said runner including a main section that has a first end formed with an inlet for feeding a plastic material and a second end opposite to the first end, and that extends in a lengthwise direction, and a tapering section that extends from the second end of said main section along the lengthwise direction, that is formed with an outlet in spatial communication with said second portion of said cavity, and that has a cross-section tapering off toward said outlet, said inlet having an axial direction that is not parallel with the lengthwise direction, thereby changing a flow direction of the plastic material that is fed into said runner through said inlet.

2. The injection molding module of claim 1, wherein said mold unit includes a first mold and a second mold, said first mold having an inner wall that cooperates with said displaceable slider to define said runner.

3. The injection molding module of claim 2, wherein said inner wall of said first mold includes an inclined region that cooperates with said displaceable slider to define said tapering section of said runner.

4. The injection molding module of claim 2, wherein said displaceable slider is displaceable relative to said first mold.

5. The injection molding module of claim 1, wherein said tapering section has a cross-section in the shape of a trapezoid.

6. The injection molding module of claim 1, wherein an included angle between the lengthwise direction and the axial direction of said inlet ranges from 27 degrees to 90 degrees.

7. The injection molding module of claim 1, wherein said outlet has a cross-section area not more than 5 mm$^2$.

8. The injection molding module of claim 1, wherein said runner has a length not more than 10 mm.

9. The injection molding module of claim 1, wherein said runner has a length and said first portion of said cavity has a width, the length of said runner being smaller than 90% of the width of said first portion of said cavity.

* * * * *